Oct. 27, 1964   R. MASSE   3,154,328
ARTICULATED UNION FOR PIPES
Filed Feb. 21, 1962

Inventor
ROGER MASSE
By Toulmin & Toulmin
Attorneys

United States Patent Office 3,154,328
Patented Oct. 27, 1964

3,154,328
ARTICULATED UNION FOR PIPES
Roger Masse, Courbevoie, France, assignor to Bronzavia
S.A., Courbevoie, Seine, France, a French company
Filed Feb. 21, 1962, Ser. No. 174,893
Claims priority, application France, Mar. 10, 1961,
855,363, Patent 1,291,060
1 Claim. (Cl. 285—233)

The present invention has for its object an articulated union (or flexible union) for pipes intended for the purpose of transferring fluids and especially, although not exclusively, fluids under pressure.

It is known that in this type of union which (contrarily to rigid unions) permits of an angular displacement of the pipe elements as well as the displacement, expansion and contraction of the said pipe elements, fluid-tightness is ensured either by means of flanged sleeves or by means of toric sealing-joints, the said sealing members being of a flexible material which is usually rubber.

The union which forms the subject of the present invention and in which the sealing means are constituted by joints of the so-called "toric" type is especially characterized in that the annular housing of the sealing-joint or of each sealing-joint, on the corresponding tube-end, is delimited by means of two rings (or like means) which are integral with the tube-end considered and which are separated from each other by a space corresponding substantially to the thickness of the sealing-joint and having in the radial direction a thickness such that the sealing-joint, which rests in the bottom of its housing, remains at least flush with the external periphery of the said rings and preferably projects from the said periphery when clamped in the centripetal direction.

In a preferred form of embodiment, the union which forms the subject of the invention is further characterized by the following features and combinations thereof:

The rings are added on to the tube-end with which they are made integral by any appropriate means, in particular (but not exclusively) by milling;

In one alternative form, the rings are annular flanges machined directly on the end of the tube;

In a further alternative form, the rings are constituted by full beads or beads formed by milling the end of the tube;

The toric sealing-joint or each toric sealing-joint, when fitted in its housing which is delimited by two rings, is clamped inside the said housing by means of a coupling sleeve;

The axial displacements of the tube or each tube and of the coupling sleeve are limited by two half-couplings provided with internal shoulders, the said half-couplings being joined together along a diametral joint plane and held assembled together by means of a fastening collar.

Further particular features and characteristics of the present invention will be brought out by the description which follows below, reference being made to two examples of construction of the union, the said examples being given solely by way of indication and illustrated diagrammatically in the accompanying drawings, in which.

Figure 1:
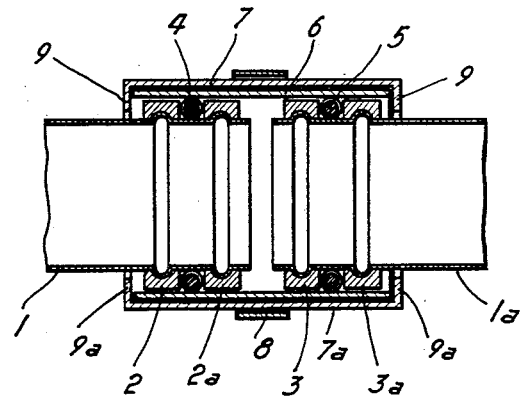
FIG. 1 is a view in axial cross-section of the articulated union (or flexible union) which is designed to join two tubes together.

In the example of FIG. 1, the references 1 and 1a designate the two tubes to be connected and the references 2, 3 and 2a, 3a designate two pairs of rings which are made integral with the aforementioned tubes. The said rings are made integral with the said tubes by means of a milling operation which permits at the same time the rounding and finishing to size of the tube-ends to be coupled together.

It can immediately be seen that, by virtue of the presence on each tube-end of two rings which are spaced apart so as to delimit the housing of the corresponding toric sealing-joint 4, 5, the seating of the sealing-joint on the tube is accordingly protected during manipulations in view of the fact that the said seating is located in a hollow.

A coupling sleeve 6 which constitutes the joining element proper is forcibly fitted over the toric sealing-joints 4 and 5.

Fluid-tightness is ensured automatically by simple adjustment to size of the external diameter of the tubes and of the internal diameter of the sleeve, and is accordingly achieved irrespective of the extents of axial movement (resulting from changes of position, expansions, shrinkages, etc.) and the extents of angular movement of the tubes, while the toric sealing-joints 4 and 5 do not move with respect to the tubes 1 and 1a but solely with respect to the sleeve 6, the seating of which is protected against shocks.

It will be noted that angular movements are made possible by virtue of the fact that the toric sealing-joints project beyond (in the diametral direction) the rings which are integral with the tubes, the said rings serving as abutments which limit these movements.

The longitudinal displacement which tends to produce the separation of the tubes is limited by internal shoulders 9, 9a formed at the ends of the half-couplings 7, 7a.

The disengagement of the tubes can be effected by simple axial relative displacement of the sleeve 6, this displacement being carried out after removal of the fastening collar 8 and the half-couplings 7, 7a over a distance which is less than one half the length of the union.

Figure 2:
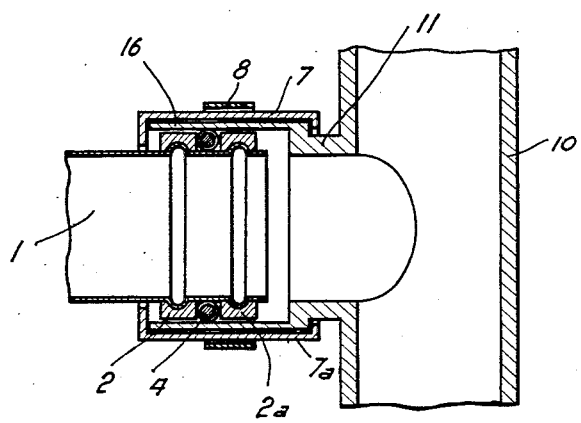
FIG. 2 is a view in axial cross-section of an alternative form in which the union forms a T-connection with a branch-pipe.

The general means which forms the subject of the present invention is also applicable to the case in which the coupling sleeve forms part of an existing element or device. One example of such an application is illustrated in FIG. 2 in which the existing device is assumed to be a T-pipe section 10 having a branch-pipe 11 provided with a portion 16 which has the function of a coupling sleeve.

In the examples referred to above, the rings 2, 2a, 3, 3a are assumed to be immobilized on the tubes as a result of a milling operation.

The said milling operation can be carried into effect by means of a milling-wheel, mandrel, etc.

In an alternative form, the rings can be machined on each tube-end.

In another alternative form, the said rings can be constituted by accentuated beads of the tube wall, while the said beads can either be full or be the result of a very extensive milling operation.

It is in any case obvious that such examples of construction of the new union, as have been described above and illustrated in the accompanying drawings, have been given solely by way of indication without any limitation being implied and that any detail modification can be made therein without consequently departing from the scope or the spirit of the invention.

What I claim is:

An articulated coupling for pipe means having at least one tubular element with a male extremity and comprising two annular abutments spaced apart and located on said male extremity so as to form, in conjunction with the external surface of said extremity, an annular groove shaped housing; a toric sealing joint in said housing, resting on the bottom of said housing and having a thickness such that when said sealing joint is clamped in the centripetal direction, its external diameter is at least equal to that of the periphery of said abutments; a sleeve surrounding the abutments and the toric sealing joint and clamping said sealing joint in the centripetal direction; two half couplings with internal shoulders surrounding said sleeve and adapted to be coupled to each other along a diametral joint plane; and a collar surrounding the two half-couplings and adapted to be tightened over said half-couplings so as to keep them coupled to each other;

wherein each of said annular abutments is a ring having an inside located annular groove, whereas the male extremity of the tubular element has, for each ring, an annular milled part fitted in said annular groove, so that the two rings are integral with said male extremity.

References Cited in the file of this patent

UNITED STATES PATENTS

| | | |
|---|---|---|
| 1,001,842 | Greenfield | Aug. 29, 1911 |
| 1,533,886 | Mueller | Apr. 14, 1925 |
| 2,460,984 | Hill | Feb. 8, 1949 |
| 2,521,127 | Price | Sept. 5, 1950 |
| 2,653,040 | Galluppi | Sept. 11, 1953 |
| 2,826,437 | Detweiler | Mar. 11, 1958 |
| 2,883,211 | Grass | Apr. 21, 1959 |
| 2,937,037 | Woolsey | May 17, 1960 |
| 3,001,804 | Tomlinson | Sept. 26, 1961 |

FOREIGN PATENTS

| | | |
|---|---|---|
| 1,115,116 | France | Dec. 26, 1955 |
| 853,738 | Germany | Oct. 27, 1952 |